United States Patent Office 3,444,465
Patented May 13, 1969

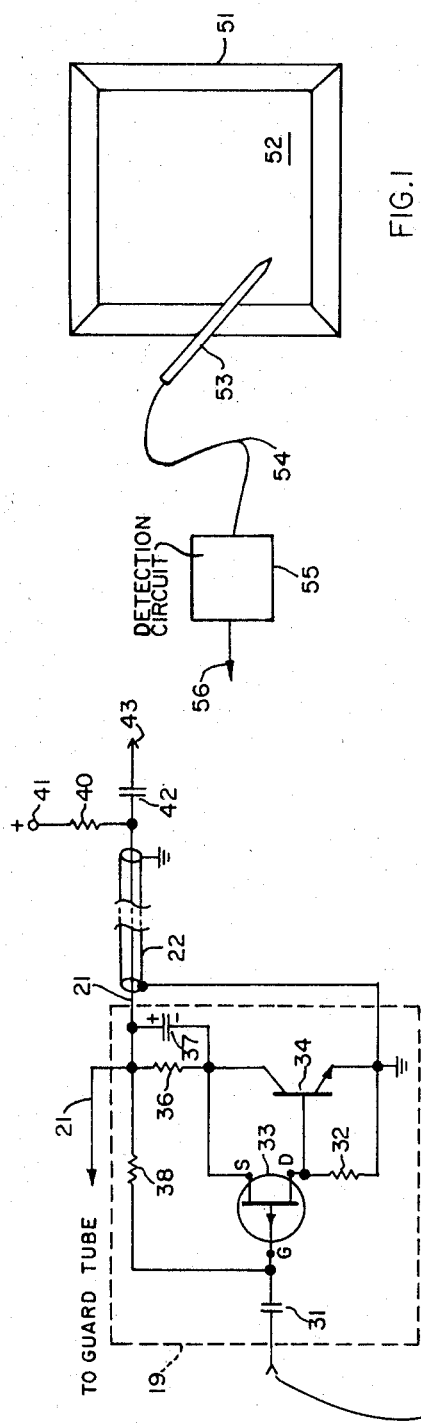

---

3,444,465
PROBE FOR A GRAPHIC COMMUNICATION SYSTEM INCLUDING MEANS FOR ELIMINATING SHUNT CAPACITANCE EFFECTS
James F. Teixeira, Hudson, Mass., assignor to Sylvania Electric Products Inc., a corporation of Delaware
Filed July 5, 1966, Ser. No. 562,725
Int. Cl. G01r *31/02;* H01h *9/06*
U.S. Cl. 324—72.5                                   7 Claims

ABSTRACT OF THE DISCLOSURE

A probe for a graphic communication system. A standard metallic ballpoint pen refill including a writing tip is enclosed within a casing with the writing tip extending through an opening at one end of the casing. The ballpoint pen refill, upon pressure being applied to the writing tip, is caused to be moved within the casing and to make electrical connection with a contact member fixedly mounted within the casing in the path of movement of the refill. In this latter position, the refill conducts electrical signals to a unity gain amplifier connected to the contact member. The output of the amplifier is applied to an output conductor and also to an electrically-conductive guard tube between the refill and the casing and surrounding the refill. The output of the amplifier maintains the guard tube and the refill at the same potential thereby effectively eliminating shunt capacitance present between the refill and the casing.

---

This invention relates generally to sensing devices, and more particularly to an improved high input impedance sensing probe for signal detection.

Electronic writing systems, or graphic entry devices, use a probe to detect signals which exist on the surface of a writing tablet. In such systems, electrical signals are generated on a surface of conductive material over which is placed an insulating layer of material to protect the conductive surface against wear. The signals generated on the conductive surface vary in accord with the positional coordinates of the surface. Therefore, when a sensing probe is brought in contact with the writing tablet, the signals associated with the point of contact are coupled to the probe, which in turn transmits the sensed signals to suitable equipment for signal processing. Thus, as the probe is moved across the surface of the writing tablet, it senses a continuous series of signals indicating the motion of the probe, the signals thereby representing an "electronic writing," which may be suitably stored, processed, transmitted or displayed as the situation requires.

Conventional probes used in such systems consist of a stylus contained in a casing. One end of the stylus provides the signal pick-up, which is then coupled from the other end of the stylus to the signal detecting circuitry. Although the probe casing is insulated from the stylus, because of the manner in which the casing surrounds the stylus, they form a coaxial capacitor, usually resulting a substantial shunting to ground of the sensed signal. Since the signal pick-up consists of the capacitive coupling from the conductive surface through a dielectric to the tip of the stylus, a relatively small capacitance, this shunting effect is quite serious, since it effectively lowers the input impedance of the probe. To overcome the deleterious effect of this shunting, it is generally necessary to maintain a relatively high signal amplitude on the conductive surface of the writing tablet in order to provide a signal capable of being accurately detected. A further disadvantage of conventional probes is that they do not provide a permanent record of the movement of the probe across the writing tablet surface. Because of this deficiency, errors cannot be immediately detected, that is, it becomes necessary to read out or display the sensed signals for correlation and correction.

It is, therefore, an object of this invention to provide a capacitive pick-up probe having a high input impedance to prevent partial loss of the sensed signal due to shunting effects. Another object of the invention is to provide a probe capable of making a permanent record of its movement on the writing surface.

Briefly, the invention provides a probe which utilizes a guard tube placed between the stylus and casing of the probe, including a high input impedance unity gain amplifier operative to maintain the guard tube at approximately the same potential as the tip of the stylus, thereby effectively eliminating the shunt capacitance between the casing and the stylus. As a result, the stylus design becomes much less critical, making it possible to use a conventional ball point pen as the stylus, so that by placing a piece of paper between the stylus and the surface of the writing tablet, a permanent record of the movement of the probe on the tablet can be made.

The foregoing and other objects, features and advantages of the invention, and a better understanding of its construction and operation, will become apparent from the following detailed description taken in conjunction with the accompanying drawings, in which:

FIG. 1 is a diagrammatic view of one system in which the invention finds utility;

FIG. 2 is a cross-sectional view taken along the length of a probe according to the invention;

FIG. 3 is a cross-sectional view of an alternate embodiment of the rear contact of a probe according to the invention; and FIG. 4 is a schematic circuit diagram of a high input impedance probe amplifier according to the invention.

One type of system in which the probe of the invention finds utility is shown in FIG. 1, this being illustrative of an electronic writing system or a graphic entry device. The system consists of a writing tablet 51, having a conductive surface 52 across which is impressed suitable electrical signals bearing a determinable relation to the positional coordinates of the surface. The probe 53 has its output 64 connected to a detection circuit 55. As the probe 53 moves across the conductive surface 52, it picks up the electrical signals from the conductive surface 52 and transmits these signals to the detection circuitry 55. The detection circuitry 55 performs the necessary signal correlation and translation, such that the output signals at terminal 56 are suitable for further signal processing, transmission or storage, the output signals being the electronic writing representing electrically the movement of the probe across the surface 52 of the writing tablet 51.

Referring now to FIG. 2, there is shown one embodiment of a sensing probe according to the invention consisting of a stylus 11 contained in a casing 10 with the writing point 12 of the stylus extending through an opening at one end of the casing. Insulating material 13, such as epoxy, supports the writing point 12 and prevents the stylus 11 from making electrical contact with the casing 10. A spacing tube 15 surrounds the rear portion of the stylus and a spring 16 is placed around the stylus between the spacing tube and a hump 17 on the stylus. A contact 18 is mounted inside the casing 10 of the probe to the rear of the stylus 11 and is connected directly to the input of a high input impedance amplifier 19. A guard tube 20 of conductive material is mounted between the stylus 11 including the contact 18, and the probe casing 10. An output 21 of the amplifier 19 is connected to the conductor of a cable 22 for transmission of the signals to suitable detecting circuitry (not shown). In addition, the output 21 of the amplifier 19 is connected directly to and drives the guard tube 20.

The probe shown in FIG. 2 functions in the following manner. Being spring loaded, the stylus 11 does not normally touch the contact 18. However, when a slight pressure is applied to the tip 12 of the stylus, as is normally done when writing, the pressure of the spring 16 is overcome and the rear of the stylus moves against the contact. The signals received by the stylus are then applied to the input of the high imput impedance amplifier 19, which is chosen to have approximately unity gain. Since the output of the amplifier 19 drives the guard tube 20, and the amplifier gain approximates unity, the signal potential on the guard tube 20 is the same as the potential on the stylus 11, thus effectively cancelling out any shunt capacitance which might otherwise exist between the stylus 11 and the casing 10 of the probe. The amplifier output 21 also drives the coaxial cable 22 which transmits the signal to suitable detection circuitry. In practice the amplifier output impedance is low enough to drive several feet of cable as well as driving the guard tube 20.

The spring loading of the stylus 11 in the probe of FIG. 2 provides a positive switch action. Thus, a signal appears at the amplifier output 21 only when the stylus 11 touches the contact 18, i.e., when sufficient pressure is applied to the tip 12 of the stylus 11. In most applications it is desirable to provide such positive swtich action to prevent the receipt of erroneous signals. However, in those applications where such switching action is not required, it will be readily apparent that the stylus can be permanently mounted within the probe with the rear of the stylus connected directly to the input of the amplifier 19. An additional advantage of the probe of FIG. 2 is that the stylus 11 may be a conventional ball point pen refill, so that a permanent record of the probe movement may be made on paper.

Referring next to FIG. 3, there is illustrated a cross-section of an alternative embodiment of the rear contact 18 of the detecting probe. This embodiment may be used only when the stylus 11 is hollow, as is a ball point pen refill. Attached to one end of the rear contact 18 is a conductive sleeve 24. The diameter of the conductive sleeve 24 must be somewhat less than the inside diameter of the hollow stylus 11 so that when the stylus moves toward the rear contact as pressure is applied to the tip, the rear of the stylus 11 surrounds, but does not touch, the conductive sleeve 24 on the rear contact 18.

The embodiment of FIG. 3 finds utility in those cases where it is necessary to provide a pedestal signal which precedes the full signal received when the actual switching action occurs thereby providing a switching action more independent of the signal path. Since the portion of the conductive sleeve 24 surrounded by the rear of the stylus 11 forms a coaxial capacitor, a portion of the signal detected by the stylus tip 12 upon touching the writing surface but before switch contact is made is coupled to the rear contact and to the input of the amplifier 19 even though the stylus 11 does not touch the rear contact 18. Using this embodiment, the system detection circuitry can then be set to reject all signals below a given threshold amplitude, depending on the ambient signals surrounding the system, thereby preventing erroneous signal detection and recording.

The amplifier circuit shown in FIG. 4 represents one embodiment of a high input impedance amplifier which meets the requirements of the amplifier 19 used in the probe of FIG. 2. The gate electrode of a field effect transistor (FET) 33 is connected via a capacitor 31 to the amplifier input terminal. The drain and source electrodes of the FET 33 are connected directly to the base and collector electrodes, respectively, of a transistor 34, the emitter of which is connected directly to a point of reference potential. The source electrode of the FET 33 is also connected via a resistor 36 to the output line 21 of the amplifier 19. The drain electrode of the FET 33 is also connected to the coaxial cable through a resistor 32. A capacitor 37 is connected between the collector electrode of the transistor 34 and the output line 21 of the amplifier 19. A feedback resistor 38 is connected between the output line 21 and the gate electrode of the FET 33. The output line 21 runs through the coaxial cable 22 and at the other end of the cable the line 21 is connected via a resistor 40 to a source of positive electrical potential as represented by the terminal 41 and via a capacitor 42 to a signal output terminal 43.

This amplifier circuit operates as a unity gain device having a high input impedance and a low output impedance. Because of its low output impedance, the amplifier is capable of driving several feet of coaxial cable in addition to supplying the necessary drive signal to the guard tube 20 of the probe. A particular advantage of this circuit is that the DC power from the source 41 may be passed through the same conductor 21 as the AC signal output, thereby permitting the DC power source to be located external to the probe, yet not requiring a separate conductor. The AC signal is developed across the load resistor 40, it being noted that the capacitor 37 effectively removes the resistor 36 from the AC circuit. In the DC circuit, resistor 36 in conjunction with the load resistor 40 provide the proper biasing potential for the FET 33. The feedback resistor 38 will have a value of the order of a few megohms such that the input terminal sees the output line conductor 21 as a very high impedance. It will be appreciated that this circuit may be modified in many ways depending on particular design requirements and preferences. For example, the resistor 36 and the capacitor 37 may be replaced by a string of one or more diodes where the cathode of the diode is connected to the collector electrode of the transistor 34 and the anode of the diode is connected to the output line conductor 21.

The foregoing description is meant to be illustrative of particular embodiments of the invention and it will be readily apparent to those skilled in the art that many modifications may be made without departing from the spirit of the invention. It is, therefore, intended that the invention not be limited to the specifics of the foregoing description, but rather is to embrace the full scope of the following claims.

What is claimed is:
1. A probe for a graphic communication system, comprising:
   an elongated casing having an opening at one end;
   a conductive writing stylus including a writing tip, said writing stylus being contained within said casing with the writing tip extending through the opening in said casing;
   a high input impedance unity gain amplifier contained within said casing and having an input terminal and an output terminal;
   an output connection from the output terminal of said amplifier;
   means for electrically connecting said writing stylus to the input terminal of said amplifier;
   a guard member of conductive material contained within said casing between said writing stylus and said casing; and
   means within said casing connecting the output terminal of said amplifier to said guard member.
2. The probe according to claim 1, wherein said means for electrically connecting said writing stylus to the input terminal of said amplifier comprises:
   a contact member mounted in said casing and connected directly to the input terminal of said amplifier; and
   spring means contained within said casing and operative to prevent said writing stylus from touching said contact member unless pressure is applied to the writing tip which extends through the opening in the said one end of said casing.

3. The probe according to claim 1, wherein said writing stylus is a metallic ballpoint pen refill.

4. The probe according to claim 1, wherein said writing stylus is hollow and wherein said means for electrically connecting said writing stylus to the input terminal of said amplifier comprises:
- a contact member connected to said amplifier input terminal, one end of which comprises a conductive sleeve the outside diameter of which is less than the inside diameter of said hollow writing stylus;
- means for mounting said contact member within said probe casing such that the conductive sleeve extends into but does not touch said hollow writing stylus; and
- spring means contained within said casing and operative to prevent said stylus from touching said contact member unless pressure is applied to the writing tip which extends through the opening in the said one end of said casing.

5. The invention according to claim 1, wherein said high input impedance, unity gain amplifier comprises:
- a field effect transistor having gate, source and drain electrodes;
- means connecting said input terminal to the gate electrode of said field effect transistor;
- a transistor having base, emitter and collector electrodes, said base and collector electrodes being connected directly to the drain and source electrodes, respectively, of said field effect transistor;
- means connecting the emitter electrode of said transistor to a point of reference potential;
- a first resistor connected between the drain electrode of said field effect transistor and the point of reference potential;
- a second resistor connected between the gate electrode of said field effect transistor and said amplifier output terminal;
- a source of energizing potential;
- means connecting said source of energizing potential to said amplifier output terminal; and
- means connecting the collector electrode of said transistor to said amplifier output terminal.

6. The invention according to claim 5 wherein said means connecting the collector electrode of said transistor to said amplifier output terminal comprises:
- a third resistor and a capacitor connected in parallel between the collector electrode of said transistor and said amplifier output terminal.

7. The invention according to claim 5 wherein said means connecting the collector electrode of said transistor to said amplifier output terminal comprises:
- a diode network including at least one diode, and connected between said amplifier output terminal and the collector electrodes of said transistor.

References Cited

UNITED STATES PATENTS

| | | | |
|---|---|---|---|
| 3,035,118 | 5/1962 | Scheuzger | 178—18 |
| 3,300,718 | 1/1967 | Umphrey | 324—149 XR |
| 3,342,935 | 9/1967 | Leifer | 178—19 |

RUDOLPH V. ROLINEC, *Primary Examiner.*

E. L. STOLARUN, *Assistant Examiner.*

U.S. Cl. X.R.

200—61.41, 157